United States Patent [19]

Mullen et al.

[11] Patent Number: 4,888,126

[45] Date of Patent: Dec. 19, 1989

[54] LIGHT MODULATING MATERIAL AND METHOD FOR PREPARING SAME

[75] Inventors: Patrick W. Mullen, Green Bay; Frederick E. Nobile, Depere, both of Wis.

[73] Assignee: Linear Optics Company, Inc., Green Bay, Wis.

[21] Appl. No.: 90,793

[22] Filed: Aug. 28, 1987

[51] Int. Cl.$^4$ .................. G02F 1/13; C09K 19/54; C09K 19/52; C09K 19/00

[52] U.S. Cl. ................. 252/299.5; 252/299.01; 428/1; 350/350 R

[58] Field of Search ............ 428/1; 252/299.01, 299.5; 350/350 R

[56] References Cited

U.S. PATENT DOCUMENTS

| | | | |
|---|---|---|---|
| 3,872,050 | 3/1975 | Benton et al. | 350/350 R |
| 3,935,337 | 1/1976 | Taylor | 350/344 |
| 4,101,207 | 7/1978 | Taylor | 350/344 |
| 4,623,738 | 10/1986 | Sugerman et al. | 556/54 |
| 4,672,089 | 6/1987 | Pricone et al. | 524/354 |
| 4,688,900 | 8/1987 | Doane et al. | 350/347 |
| 4,707,080 | 2/1978 | Fergason | 350/344 |
| 4,742,097 | 11/1986 | Turpin et al. | 523/407 |

Primary Examiner—Teddy S. Gron
Assistant Examiner—Richard Treanor
Attorney, Agent, or Firm—Willian Brinks Olds Hofer Gilson & Lione

[57] ABSTRACT

An improved light modulating material for use in electro-optic and thermo-optic display devices is produced by forming a homogeneous solution comprising an acrylic resin containing active hydrogen groups, a liquid crystal material, a diisocyanate or epoxide, and a solvent. The homogeneous solution is preferably applied to a conductive substrate and the solvent is then evaporated, causing phase separation resulting in formation of a liquid crystal phase dispersed within a solid polymer matrix. Application of an electric field to the substrate causes the liquid crystal material to align, which in turn causes the coating to switch from substantially translucent to substantially transparent. If the electric field is removed the light modulating material again becomes substantially translucent. Switching times can be improved by incorporating a titanate or zirconate organometallic material into the light modulating material.

8 Claims, 4 Drawing Sheets

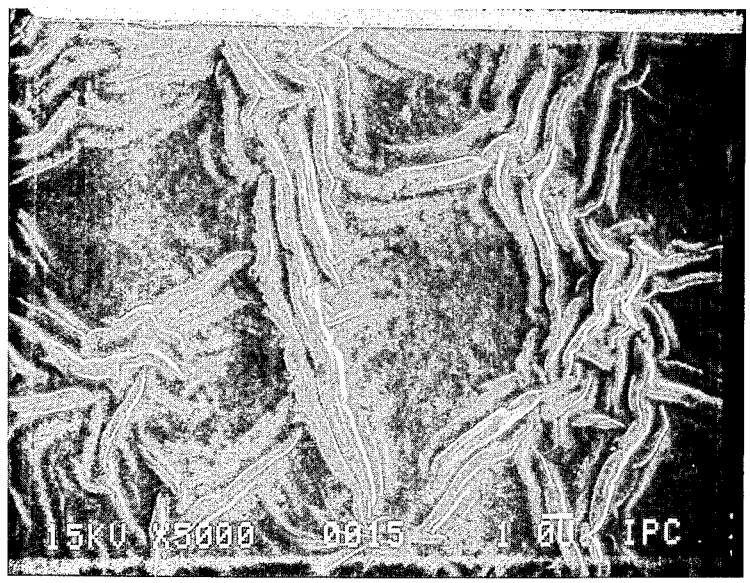
FIG. IA
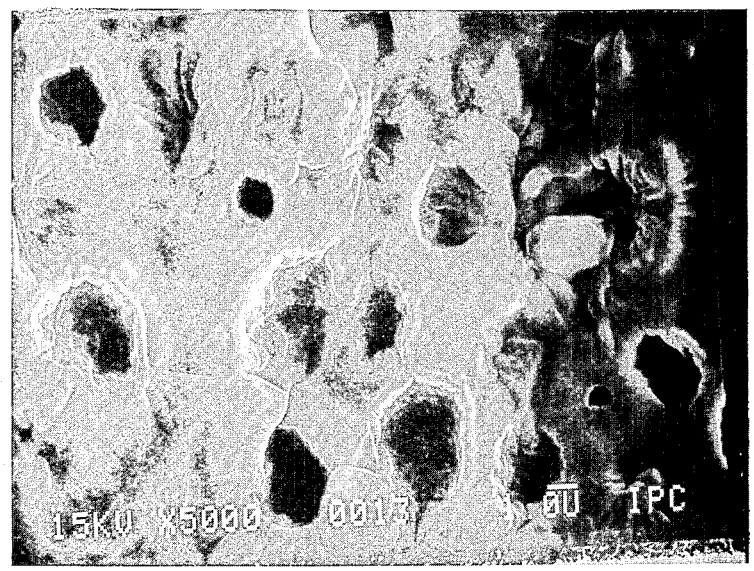
FIG. IB
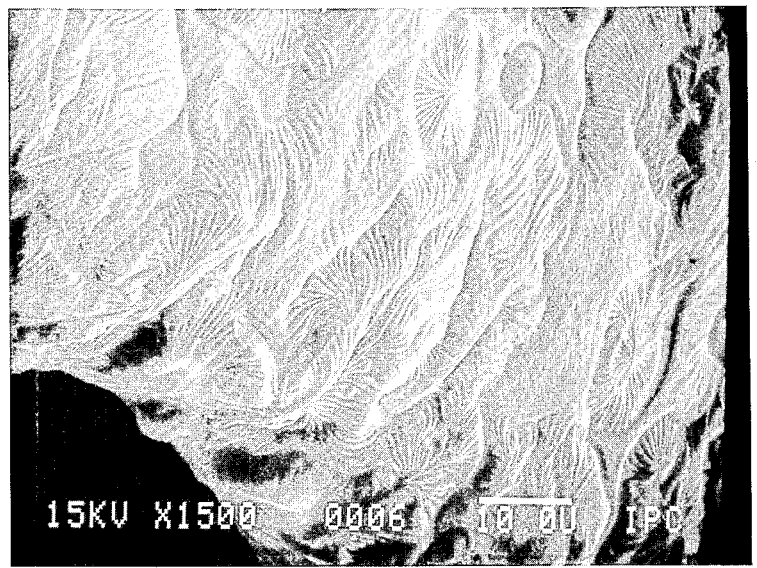
FIG. IC

HYDROXY ACRYLIC RESIN MATRIX

TIME — 1 SEC. TURN-ON

URETHANE ACRYLIC RESIN MATRIX

TIME — 1 SEC. TURN-ON

LIGHT MODULATING MATERIAL AND METHOD FOR PREPARING SAME

FIELD OF THE INVENTION

The present invention relates to an improved light modulating material and method of manufacturing the same for thermo-optic and electro-optic display devices.

BACKGROUND OF THE INVENTION

Liquid crystals have been used in the past in a wide variety of electro-optic and thermo-optic display applications. These include, in particular, electro-optic light modulating applications which require compact, energy-efficient, voltage-controlled light, such as watch and calculator displays. The electro-optic devices utilize the dielectric alignment effect in nematic, cholesteric and smectic phases of the liquid crystal, in which, by virtue of dielectric anisotropy, the average molecular long axis of the liquid crystal takes up a given orientation in an applied electric field. Thermo-optic devices accomplish the orientation or simple melting to the isotropic state via a temperature change.

The processes conventionally used for incorporating liquid crystals into a practical display form are generally complex and demanding. Display products are normally produced by sandwiching the liquid crystal material between two sheets of glass having electrically conductive coatings and then sealing the entire peripheral edge of the sandwich structure.

Conventional manufacturing makes it difficult to produce displays of large size, or having unusual shapes. In an attempt to expand the size and utility of liquid crystal displays, many methods have been suggested for coating liquid crystal material with various polymers to simplify their handling and generally allow for larger sheet construction of display or light modulating materials.

U.S. Pat. No. 4,435,047, for example, describes water emulsion methods both for encapsulating nematic liquid crystal material and for making a liquid crystal device using such encapsulated liquid crystal materials. However, there are a number of inherent difficulties one encounters when working with water emulsion systems. These include difficulty in obtaining and holding a uniform droplet size in the emulsion, poor spreading on plastic, and inability to dissolve and carry important additives in the system such as dyes, plasticizers, or electrical property modifiers.

More recently, a simplified approach was disclosed in "Field Controlled Light Scattering From Nematic Microdroplets", Doane et al. In this approach, microdroplets of a liquid crystal material were spontaneously formed in a solid epoxy polymer at the time of its polymerization. The cured polymer matrix containing these microdroplets was sandwiched between two layers of glass containing a conductive coating. This approach has simplified the manufacture of displays over processes using free liquid crystals or encapsulated liquid crystals. However, conventional curing of polymers such as an epoxy causes difficulties in coating and laminating in a continuous process. The materials are very low in viscosity during the coating step and cannot be laminated while soft due to leakage of monomer out of the edges of the laminate.

Light modulating materials containing microdroplets of liquid crystal material within a thermoplastic matrix have also been proposed. Such materials suffer a number of drawbacks in commercial application including limited temperature range, fatigue, slow switching times, and limited durability.

SUMMARY OF THE INVENTION

The invention is directed to improved, durable light modulating materials which are capable of rapid, reversible switching between a substantially translucent light scattering or diffusing state and a substantially clear or transparent state, without noticeable fatigue, when subjected to thermal cycling, a magnetic field or preferably an electrical field. The invention also is directed to methods of manufacturing such materials and devices employing such materials.

In one aspect of the invention, a liquid crystal phase is substantially uniformly dispersed within a polymer matrix which comprises a preferably transparent, acrylic resin containing active hydrogen groups, such as hydroxy-functional acrylic resins and carboxy-functional acrylic resins, and a suitable crosslinking agent. The liquid crystal material preferably comprises a nematic type material, such as a cyanobiphenyl or a cyanoterphenyl, or a mixture of a nematic type material and chiral mesogenic material. Preferably, the acrylic resin and the liquid crystal material have closely matching indices of refraction so that the light modulating material may appear substantially clear or transparent under certain conditions of use. Preferably, the liquid crystal phase forms spontaneously upon evaporation or cooling of a homogeneous solution comprising the liquid crystal material and the acrylic polymer.

In a preferred aspect of the invention, an acrylic resin containing active hydroxy-functional groups is reacted with a diisocyanate containing material to form a urethane-acrylic copolymer which becomes part of the polymer matrix. This reaction primarily occurs after formation of the light modulating material, e.g., after application of the light modulating material to a conductive medium and evaporation of the solvent, and causes the light modulating material to take on many of the durability and other advantages of a thermoset acrylic polymer. Because the reaction primarily occurs after formation of the material, the processing difficulties normally associated with a thermoset resin are not encountered in fabricating the light modulating material of the invention.

In another preferred aspect of the invention, organometallic compounds, preferably titanate or zirconate materials, are incorporated into the light modulating material in order to reduce the turn-on time of the liquid crystal phase and/or reduce the voltage required to achieve substantial transparency.

In preparing the preferred light modulating material of the invention, the hydroxy-functional acrylic resin is normally dissolved in a solvent. The liquid crystal material, along with the diisocyanate containing material, dyes and other additives, are incorporated into the solvent solution to form a homogeneous solution. The solution is then applied to a surface, such as a conductive surface, by coating or casting techniques. Upon evaporation of the solvent, a solid, handleable film is produced which may immediately be used to fabricate a thermo-optic or electro-optic display device. However, over a time period of up to a few days, the hydroxy-functional groups on the acrylic resin continue to react with the diisocyanate to form a urethane-acrylic copolymer which transforms the polymer matrix into a cross-linked material with improved durability and a higher maximum operating temperature. These preferred cross-linked light modulating materials exhibit rapid turn-off time and no noticeable fatigue. Fatigue is the tendency of many light modulating materials to lose their ability to completely revert to their normally off state (the translucent state for most materials) after an electric field has been applied for a prolonged period of time or has been switched off and on a very large number of times.

The liquid crystal material is present in a phase formed within a polymer matrix. Preferably, the liquid crystal material is present in sufficient concentration to form apparently interconnected networks randomly distributed throughout the polymer matrix (see FIG. 1). These networks are believed to comprise a multiplicity of domains having locally oriented optic axes which, in aggregate, are normally randomly oriented and scatter light, thereby giving the polymeric film a substantially opaque or translucent appearance. Alternatively, the liquid crystal phase may be present in lower concentration in the form of discrete domains or microdroplets within the polymer matrix, the optic axes of which are normally randomly oriented and scatter light.

Upon application of an electric field, the optic axes of the liquid crystal domains become aligned, and under a suitable choice of indices of refraction of the materials, the film will appear substantially clear or transparent. Upon removal of the electric field, the liquid crystals return to their original random alignment. This behavior of the material is useful in the fabrication of light-controlling devices.

By properly adjusting the formulation of the light modulating material, the liquid crystal domains will return immediately to random alignment after removal of the electric potential. Alternatively, the formulation can be adjusted to achieve a memory state in which the axes of the liquid crystal domains will remain in alignment for a period of time after the electrical potential is removed. The memory state is an at times desirable, completely "on" state, differing from the generally undesirable "fatigue" situation mentioned previously in which the material stays in a partial "on" state after being switched off.

With the composition of the invention, phase separation normally occurs spontaneously as the solvent evaporates. The time for phase separation can be as short as a few seconds. After evaporation of the solvent, the polymer matrix is rigid enough that the coated material can immediately be laminated to a second conductive film or sheet.

In another aspect of the invention, dyes may be added to the liquid crystal material, becoming part of the liquid crystal phase when the liquid crystal material separates. This produces a colored opaque or translucent state in the material, and enables the display device to change between a colored state and a substantially transparent one.

With the foregoing in mind, a principal advantage of the invention is that it provides a simple, economical, efficient method of incorporating liquid crystal material into a polymer matrix to provide an improved light modulating material for display devices.

Another principal advantage of the invention is that it provides an improved light modulating material which can be easily applied to a surface using coating or casting techniques and which hardens and copolymerizes subsequent to film formation, causing the material to take on many of the durability and other advantages of thermoset polymers, such as retention of optical properties after repeated thermal or electrical cycling.

Another principal advantage of the invention is that it provides an electro-optic and thermo-optic display material which responds quickly (i.e. changes quickly between opaque and transparent) when an electric field is switched on and off, or when a temperature change is induced. Moreover, the light modulating material of the invention exhibits no noticeable fatigue or degradation of optical properties after extended operation.

A further advantage of the invention is the provision of an electro-optic and thermo-optic display material in which the display device can change between a colored and a substantially transparent state.

Another advantage is that the light modulating material of the invention is operable at lower voltages than known thermoplastic-based light modulating materials.

The foregoing and other features an advantages of the invention will appear in the following detailed description.

BRIEF DESCRIPTION OF THE DRAWINGS

FIG. 1 includes photomicrographs of a typical light modulating material made in accordance with the invention showing an interconnected liquid crystal phase within a polymer matrix. FIG. 1A is a photomicrograph of the surface of a light modulating material of the invention containing urethane-acrylic copolymer, made in substantially the same manner as the material of Example 5B.

FIG. 1B is a photomicrograph of a vertical freezfracture cross-section of a light modulating material of the invention containing urethane-acrylic copolymer, made in substantially the same manner as the material of Example 5B.

FIG. 1C is a photomicrograph of a diagonal freeze fracture cross-section of a light modulating material of the invention containing urethane-acrylic copolymer, made in substantially the same manner as the material of Example 5B.

DETAILED DESCRIPTION OF THE PRESENTLY PREFERRED EMBODIMENTS

Figure 2A:
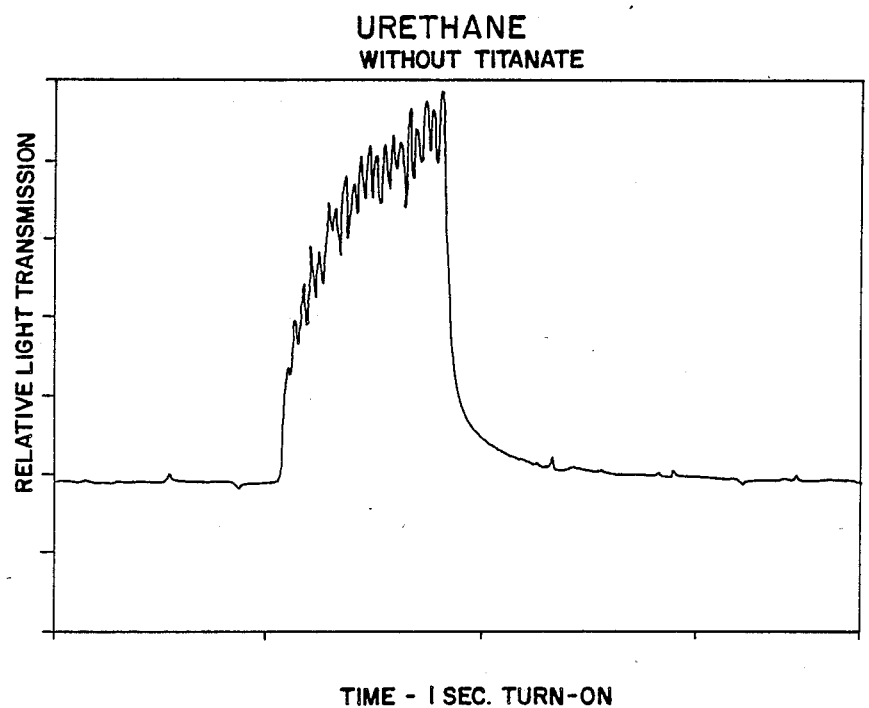
FIG. 2 includes graphs showing the switching behavior of the light modulating materials prepared in Example 5 and illustrates the improved switching time resulting from the use of organometallic complexes.

In preparing the light modulating material of the invention, the polymer or polymers which form the polymer matrix and the liquid crystal material, together with any other components, are normally dissolved in a compatible solvent to form a homogeneous solution. The solution is then applied to a surface, e.g., to an electrically conductive surface, using a conventional casting or coating method. Phase separation between the polymer and the liquid crystal material occurs subsequent to application, as the solvent is evaporated. This phase separation results in the formation of an interconnected or discrete liquid crystal phase within a polymer matrix, as shown in FIGS. 1B and 1C. solvent evaporates, the polymer hardens to form a solid matrix for the liquid crystal phase.

Alternatively, the polymer may be heated to a soft or molten state to which the liquid crystal and other components are added to form a homogeneous solution. In this case, phase separation occurs as the solution is cooled.

In preferred embodiments of the invention, the polymer materials used to form the homogeneous solution include a cross-linking acrylic resin or resins containing active, i.e., reactive, hydrogen groups, such as hydroxy-functional acrylic resins and carboxy-functional acrylic resins. Hydroxy-functional acrylic resins are preferred.

Suitable hydroxy-functional, cross-linkable acrylic resins include Rohm and Haas 608X, Johnson Wax CDX 587, and Johnson Wax 800B. The preferred hydroxyfunctional acrylic resin is Johnson Wax 800 B. Suitable carboxy-functional, cross-linkable acrylic resins include Johnson Wax SCX-S15B and SCX-817B. Preferably, the acrylic resin has an index of refraction which closely matches the index of refraction of the aligned liquid crystal material so that the resulting light modulating material or film will appear clear or transparent when the optic axes of the liquid crystal phase are aligned.

In certain preferred embodiments, the homogeneous solution may also include an additional thermoplastic resin, such as Rohm and Haas B44 or A30, both of which are conventional, nonreactive thermoplastic acrylic resins. Such resins also should have a suitable index of refraction for matching with the liquid crystal material. When such resins are employed, the weight ratio between the active hydrogen containing acrylic resin and the additional thermoplastic material will normally range from between 10:1 to 1:1.

In the preferred embodiments of the invention which employ hydroxy-functional acrylic resins, a diisocyanate containing compound or material will normally be incorporated into the initial homogeneous solution. This diisocyanate containing material reacts slowly with the active hydrogen groups on the acrylic resin, over the course of a few hours to a few days or so and normally with the aid of a suitable catalyst, to form a urethane-acrylic copolymer. This copolymerization process, which principally occurs after evaporation of the solvent, causes the light modulating material to take on many of the durability and other advantages of a thermoset acrylic polymer, while retaining the continuous casting advantages associated with the use of a thermoplastic resin binder.

Diisocyanate materials suitable for this purpose include both aromatic and aliphatic diisocyanates, such as toluene diisocyanate and hexamethylene diisocyanate. The preferred diisocyanate material is hexamethylene diisocyanate.

Preferably, the molar ratio of the diisocyanate material to the hydroxy-functional acrylic resin is between 0.2:1 and 1:1.

All of the reactive sites on the acrylic backbone need not be reacted with diisocyanate. Normally, the resulting polymer matrix will contain a mixture of unreacted hydroxy-functional acrylic resin and urethaneacrylic copolymer. The ratio of these polymers varies with both the reaction conditions and the starting ratio of the diisocyanate material to the reactive acrylic resin.

Suitable catalysts for the isocyanate-active hydrogen reaction include dibutyl tin dilaurate and zinc octoate. Normally, the catalyst is present in a concentration of about 0.001 to 0.01% with respect to the reactive polymer.

In embodiments of the invention which employ carboxy-functional acrylic resins, an epoxide containing compound or material will normally be incorporated into the initial homogeneous solution. This epoxide material reacts slowly with the active hydrogen groups on the carboxy-functional acrylic resin, over the course of a few hours to a few days or so and normally with the aid of a suitable catalyst, to form an epoxy-acrylic copolymer. This copolymerization process, like the previously described reaction between hydroxy-functional acrylic resins and diisocyanates, principally occurs after evaporation of the solvent and causes the light modulating material to take on many of the durability and other advantages of a thermoset acrylic polymer, while retaining the continuous casting advantages of a thermoplastic resin binder.

Again, it is not necessary that all of the reactive sites on the acrylic backbone react with epoxide. Depending on the reaction conditions and the starting ratio of the epoxide material to the carboxy-functional acrylic resin, the resulting polymer matrix will contain varying amounts of both the carboxy-functional acrylic resin and the epoxy-acrylic copolymer.

The liquid crystal material can be a ferroelectric, cholestric, smectic or nematic material, with a nematic materials being most preferred. Suitable liquid crystal materials include cyanobiphenyls, cyanoterphenyls, cyanophenylcyclohexanes, phenylpyrimidines, cyclohexophenyl pyrimidines, alkylbenzoates, cyanobenzoates, and mixtures of the foregoing. Specific examples of liquid crystal materials are S2, E7, K24, and TM74A, all manufactured and sold by BDH Chemicals, Limited. Other examples include ROTN 132, 3010, S3033/1293, 3910, 3912, 403 and 607, all manufactured and sold by Hoffman La Roche Chemical Company. Also included are ZLI 1263, 1222, and 1905, manufactured and sold by E. Merck Chemical Company. The most preferred liquid crystal materials are E7 and ROTN 132.

In a highly preferred embodiment of the invention, the liquid crystal material will include a mixture of nematic compounds with a minor amount of chiral mesogenic compounds, for example cholesteric esters. A liquid crystal mixture including between 90.0 and 99.5% by weight of nematic compounds and between 10.0 and 0.5% by weight chiral mesogenic compounds results in a faster switching time when a field is removed or turned off. The preferred chiral mesogenic compounds for use in such mixtures include cholesterol benzoate and chiral pentyl cyanobiphenyl.

Normally, the liquid crystal material is present in a weight ratio of about 1:5 to 1:0.5 with respect to the polymeric materials, including any diisocyanate or epoxide containing material, with a weight ratio of about 1:1 to 2:1 being preferred.

Dichroic or other dyes may also be added to the solution. When a dye is used, the dye will preferably be substantially separated into the liquid crystal phase resulting in the light modulating material normally having a colored opaque appearance, which can be changed to a transparent or clear appearance by application of an electrical potential or temperature change as described above. Examples of suitable dichroic dyes include anthraquinones D5 or D35 from BDH Chemicals, Ltd., and S3026 from Hoffman La Roche Chemical Company. Other dyes which are normally not classified as dichroic dyes, such as Rhodamine 6G or Sudan III from Eastman Kodak Company, also function well in the system.

Other additives in an amount up to about 10% by weight of the liquid crystals can be added to the initial polymer solution. These additives may be dispersants, surfactants, or other aids which improve the contrast, appearance or performance of the resulting light modulating material. By proper selection of the liquid crystal materials and the associated additives, the liquid crystal phase can either return to its random orientation immediately after removal of the electric field or, alternatively, memory can be built into the material, in which case the liquid crystal phase will retain its orientation for a period of time after removal of the electric field and before returning to random alignment. The addition of materials such as surfactants or dyes to the solvent solution can change the switching time of the light modulating material.

In a highly preferred embodiment of the invention, an organometallic compound, preferably a titanate or zirconate compound, is added to the initial solution to reduce the time required to orient the liquid crystal phase, normally by an order of magnitude such as from about 250 milliseconds to about 10 milliseconds or less. Alternatively, an organometallic compound may be used to reduce the voltage required to achieve substantial transparency. During phase separation, it is believed that these compounds become part of the polymer matrix.

Suitable titanate compounds include neopentyl (diallyl) oxy, tri (dodecyl) benzene-sulfonyl titanate and neopentyl (diallyl) oxy, tri (N-ethylenediamino) ethyl titanate. Suitable zirconate compounds include neopentyl (diallyl) oxy, tri (dodecyl) benzene-sulfonyl zirconate and neopentyl (diallyl) oxy, tri (N-ethylenediamino) ethyl zirconate. The preferred organometallic compounds are mixtures of titanate or zirconates. The amount of organometallic compounds required varies with the degree of improvement sought in the switching time. Preferably, the weight ratio of the organometallic compound to the liquid crystal material is between 0.002:1 and 0.05:1.

Normally, in preparing the homogeneous solution, the polymer is first dissolved in a solvent suitable for the polymer. It is preferred that the solvent be one that will evaporate at or near ambient temperatures. Solvents that can be used include cyclohexanone, toluene, ethyl acetate, and chloroform. After the polymer has dissolved, the liquid crystal material is then added to the solvent solution, along with dyes or other additives, as desired, in order to form a normally clear, homogeneous solution. No special mixing conditions are normally required.

The homogeneous solution containing the components of the light modulating material can be applied by roller coating, casting, brushing, or the like, to a suitable surface, such as an endless belt, a plastic film, or a suitably prepared electrically conductive surface. The electrically conductive surface may be any conductive material commonly used in electro-optic display devices. A common conductive material is a film of aluminum or indium tin oxide applied to a base of a polyester film, a glass plate, or the like.

Normally, the homogeneous solution is applied to the surface as a thin film having a thickness between about 1 to 4 mils. After application, the solvent is preferably evaporated at or near ambient temperature to form a solid film which generally has a thickness in the range of 0.3 to 3.0 mils. However, heat may be applied to the film to aid in the evaporation process.

During the evaporation of the solvent, or soon thereafter, the film will normally turn from a clear solution into a cloudy or opaque film. This indicates that phase separation has taken place between the liquid crystal material and the polymer matrix and that the liquid crystal phase has formed. This occurs spontaneously as the solvent evaporates, and the time for phase separation is normally less than a minute and can be as short as a few seconds. The opaque or cloudy appearance of the polymeric film results from the random orientation of domains within the liquid crystal phase.

After evaporation of the solvent, the polymer matrix is rigid enough that the film can immediately be laminated to another material, such as a second conductive film or sheet and/or used to form a display device. When a diisocyanate or epoxide compound is present in the homogeneous solution, it remains substantially in the polymer matrix portion of the film and, over a period of about a few hours to a few days, reacts with the active groups on the acrylic resin to form a cross-linked acrylic-urethane or acrylic-epoxy copolymer. This causes the light modulating material to take on many of the durability advantages of a thermoset acrylic polymer.

By applying an electric potential, generally in the range of 10 to 200 volts, across portions of the film, the optic axes of the liquid crystal domains become aligned, causing all or portions of the film subject to the electric potential to become substantially clear or transparent. The effectiveness of this phenomenon depends to a large extent on the indices of refraction of the liquid crystal materials and of the polymer matrix. Optimum levels of transparency are achieved when the index of refraction of the liquid crystal material is closely matched to the index of refraction of the polymer matrix, a process that usually is determined by trial and error. The level of obtainable transparency decreases as the disparity between the indices of refraction increases.

An electric potential can be applied to the light modulating material using an electric stylus, print element, or ion source. When a stylus is used, for example, letters or words can be formed on the light modulating layer. Alternatively, the light modulating material can be sandwiched between two electrically conductive layers. When two electrically conductive layers are used, an electric potential can be programmed to be passed across certain portions or areas of the light modulating material to create the desired message or effect.

The light modulating material of the invention can be used in many electro-optic display applications, such as signs, electro-optic windows, clocks, mirrors and the like.

The light modulating material of the invention can also be imaged thermally by such means as a heated stylus, laser, or elevated ambient temperature, and is therefore useful in temperature indicating devices, thermographic applications, and the like. The following examples illustrate the preparation of the light modulating material of the invention.

EXAMPLE 1

The following materials were mixed and then cast on the conductive side of indium tin oxide coated polyester at a wet thickness of 3.0 mils.

- 1.15 g—(35% in toluene) Rohm and Haas, 608X, hydroxy-functional acrylic resin.
- 0.80 g—BDH Chemical Ltd., E7 liquid crystal mix.
- 0.64 g—(20% in toluene) Mobay Chemical Co., N75, hexamethylene diisocyanate.
- 0.01 g—(0.1% in toluene) M and T Chemical Co., dibutyl tin dilaurate.

The toluene was allowed to evaporate for 10 minutes at room temperature to form a translucent layer. A second piece of ITO coated Mylar was then laminated to the translucent layer with a hot (120° F.) roll. The laminate turned clear when subjected to a field of about 35 volts A.C. (VAC).

EXAMPLE 2

The following materials were mixed, coated and laminated as in Example 1.

- 4.76 g—(35% in toluene) Rohm and Haas. B44, thermoplastic acrylic resin.
- 4.36 g—(35% in toluene) Johnson Wax, 800B, hydroxy-functional acrylic resin.
- 4.00 g—Hoffman La Roche, ROTN 570, nematic liquid crystal mix.
- 0.63 g—(20% in toluene) Mobay Chemical Company, N75, hexamethylene diisocyanate resin.
- 0.43 g—(1% in toluene) Kenrich Petroleum Co., LICA 44 neoalkoxy titanate.
- 0.22 g—(1% in toluene) Kenrich Petroleum Co., LICA 09 neoalkoxy titanate.
- 0.48 g—(0.1% in toluene) Aldrich Chemical Co. di-butyl tin dilaurate.
- 1.20 g—(1.0% in toluene) BDH Chemical Ltd. CB15 chiral mesogenic liquid crystal.

The laminate turned clear when subjected to a field of about 60 VAC.

EXAMPLE 3

The following materials were mixed and allowed to stand for 30 minutes. The solution was then filtered, cast and laminated as in Example 1.

- 3.90 g—(35% in toluene) Johnson Wax, 800B, hydroxy-functional acrylic resin.
- 3.00 g—BDH Chemicals, Ltd., E7 liquid crystal mix.
- 0.58 g—(20% in toluene) Mobay Chemical Co., N75, hexamethylene diisocyanate resin.
- 0.30 g—(1% in toluene) Kenrich Petroleum Co., LZ 44, neoalkoxy zirconate.
- 0.15 g—(1% in toluene) Kenrich Petroleum Co., LE 09, neoalkoxy zirconate.
- 0.40 g—(0.1% in toluene) Aldrich Chemical Co., di-butyl tin dilaurate.

The finished laminate turned on (became transparent) at 38 VAC with a turn on time which was substantially faster than the same material without the zirconate additives.

EXAMPLE 4

The following materials were mixed, cast as a 2 mil wet film, dried and laminated as in the previous examples.

- 3.96 g—(35% in ethyl acetate) Johnson Wax, 800B hydroxy-functional acrylic resin.
- 0.29 g—(20% in ethyl acetate) Mobay Chemical Co., N75, hexamethylene diisocyanate resin.
- 3.00 g—ROTN 132, Hoffman La Roche liquid crystal.
- 0.30 g—(1% in toluene) Kenrich Petroleum, LICA 44, neoalkoxy titanate.
- 0.15 g—(1% in ethyl acetate) Kenrich Petroleum, LICA 09, neoalkoxy titanate.
- 0.45 g—(10% in toluene) Troy Chemical Co., colloidisperse.

The material was allowed to stand for 24 hours at room temperature and then it was switched on at about 28 VAC. This is approximately 1.2 V per micron of film thickness.

EXAMPLE 5

5A

The following ingredients were mixed, cast and laminated as in Example 4.

- 3.00 g—ROTN 570 liquid crystal from Hoffman La Roche Chemical Co.
- 2.80 g—(50% in toluene) Johnson Wax, 800B, hydroxy-functional acrylic resin.
- 2.90 g—(20% in toluene) Mobay Chemical Co., N75, hexamethylene diisocyanate.
- 0.43 g—(0.1% in toluene) di-butyl tin dilaurate.
- 0.8 g—toluene.

Figure 2B:
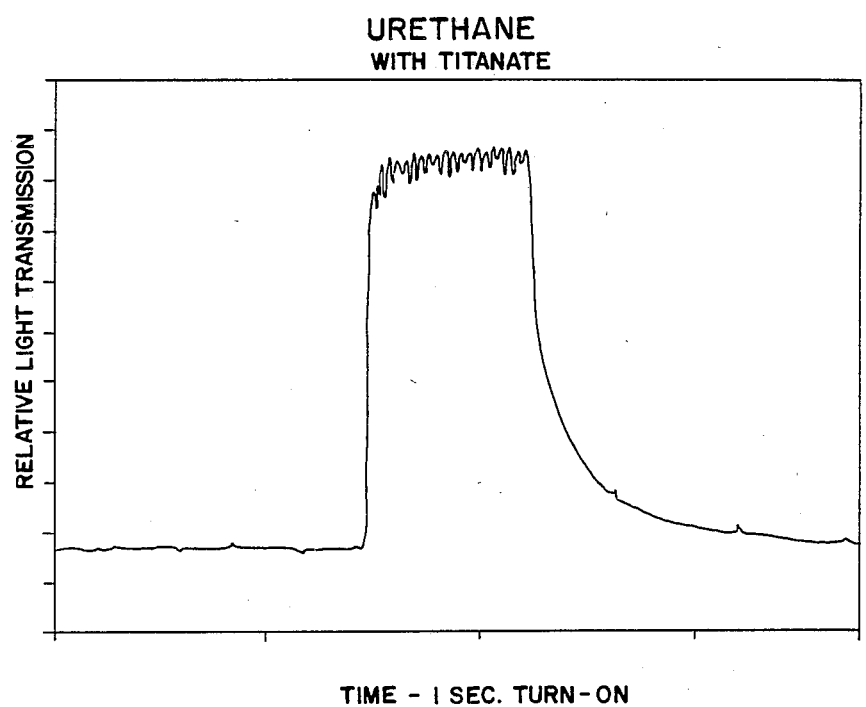

The samples were allowed to stand for 24 hours prior to testing. The results of a switching time test of this material using 40 VAC, 100 Hertz, held on for one second, are shown in FIG. 2. The slanted ramp indicates a slow witching from the translucent state to the transparent state.

Figure 3A:
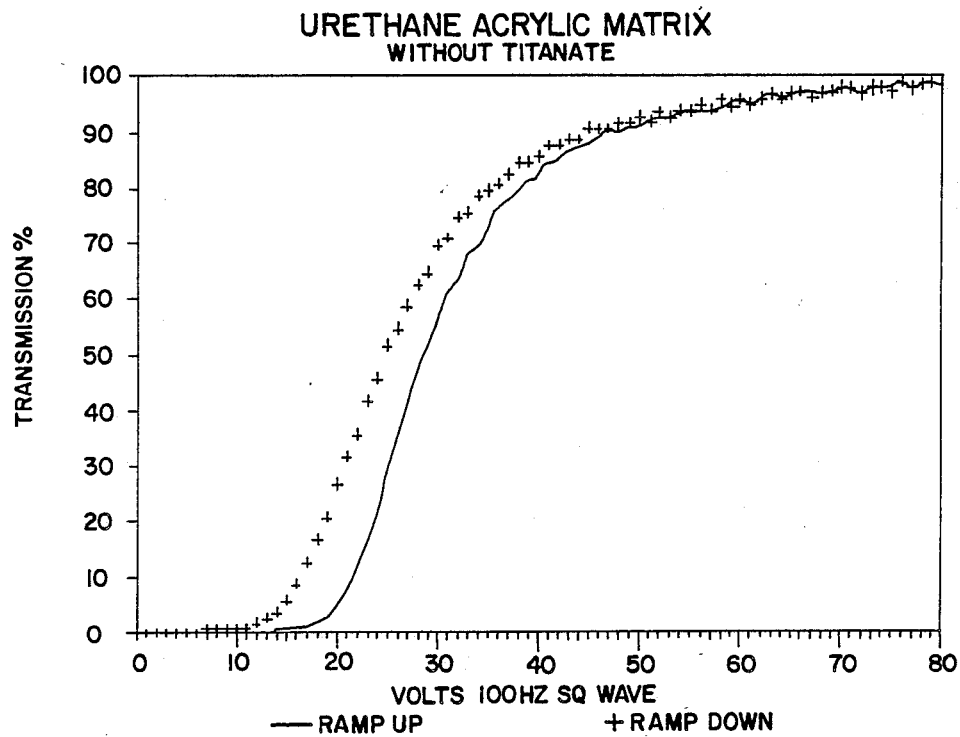
FIG. 3 shows plots of transmission vs. voltage for the light modulating materials of Example 5 and illustrates the lower voltages required to effect complete or partial "turn-on" when organometallic compounds are incorporated.
Figure 3B:
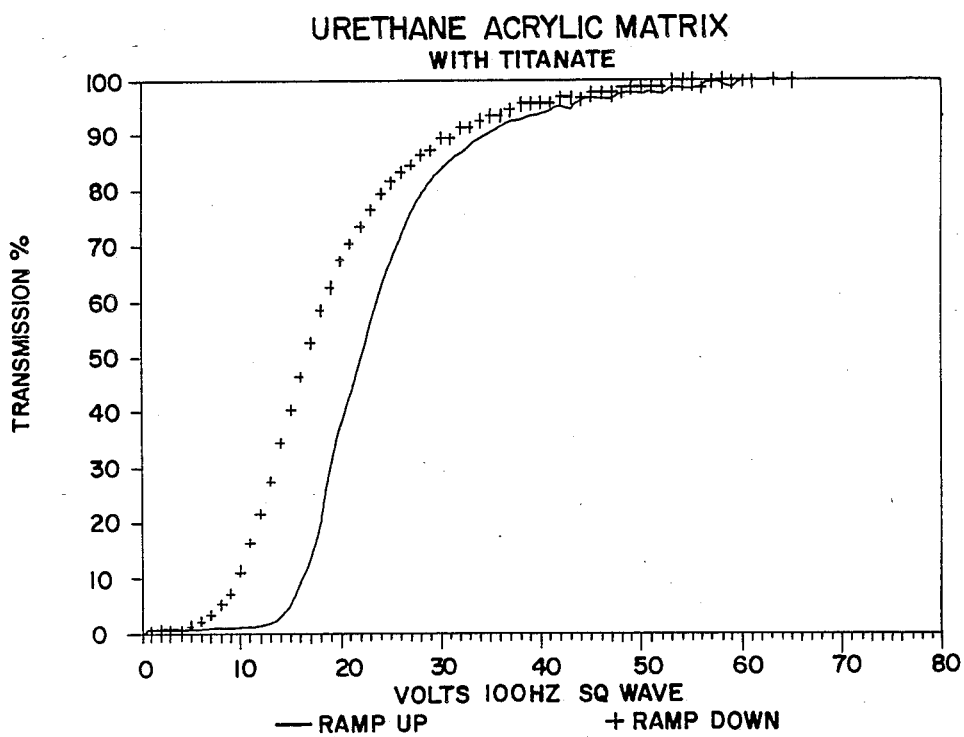
Figure 4A:
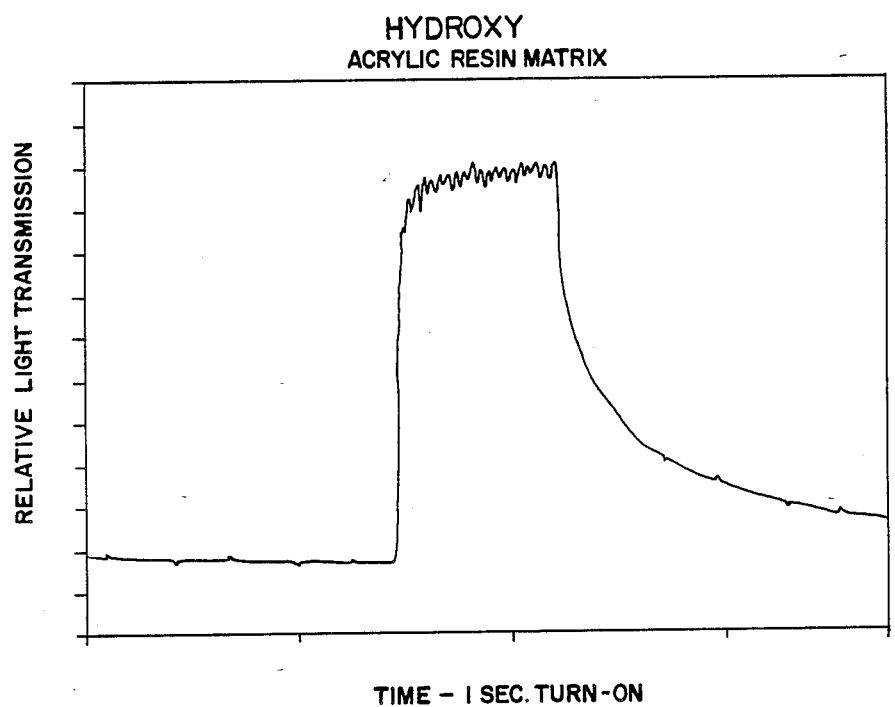
FIG. 4 includes graphs showing the switching behavior of the light modulating materials prepared in Example 7 and illustrates the improved switching time resulting from the use of a crosslinking agent.
Figure 4B:
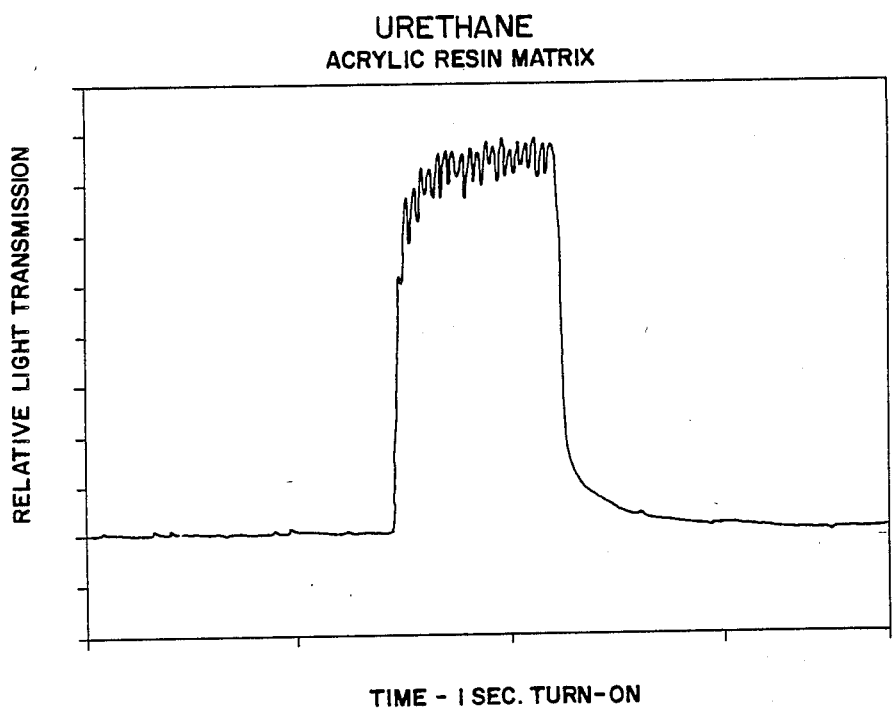

The results of another test during which transmission was measured as a function of voltage are shown in FIG. 3. The solid line indicates transmission as a function of voltage as the voltage is being increased. The broken line indicates hysteris (i.e. higher transmission at each voltage level) as the voltage is being lowered.

5B

The following ingredients were mixed, cast and laminated as in Example 5A:

- 3.00 g—ROTN 570 liquid crystal.
- 2.80 g—50% 800B in toluene.
- 2.80 g—20% N75 in toluene.
- 0.90 g—1% KS100 organometallic titanate complex in toluene (Kenrich Petroleum)
- 0.43 g—0.1% dibutyl tin dilaurate in toluene.
- 0.90 g—toluene.

The results of a switching time test of this material using 40 VAC, 100 Hertz, for one second, also are shown in FIG. 2. This example is illustrative of the effect which the organometallic complexes can have on improving the switching time of an electro-optic device. The absence of a slanted ramp indicates that the light modulating material of Example 5B switches quickly and throughly from the translucent state to the transparent state.

The graphs of FIG. 2 also illustrate the rapid turn off time obtainable with the light modulating materials of the invention and that the organometallic complexes employed in certain preferred embodiments, as in Example 5B, do not adversely affect the turn-off time. FIG. 3 also shows transmission versus voltage for this material. The presence of titanate causes a significant lowering of the voltage required to achieve any given percentage of transmission, up to and including com-